Jan. 6, 1970 M. ROSENBLATT 3,488,663

APPARATUS FOR COMPARISON AND CORRECTION OF SUCCESSIVE RECORDED PULSES

Original Filed May 25, 1961 3 Sheets-Sheet 1

INVENTOR.
MURRAY ROSENBLATT
BY H. Christoffersen
ATTORNEY

INVENTOR.
MURRAY ROSENBLATT
BY H. Christoffersen
ATTORNEY

INVENTOR.
MURRAY ROSENBLATT
BY H. Christoffersen
ATTORNEY 3,488,663

APPARATUS FOR COMPARISON AND CORRECTION OF SUCCESSIVE RECORDED PULSES

Murray Rosenblatt, Cherry Hill, N.J., assignor to RCA Corporation, a corporation of Delaware Original application May 25, 1961, Ser. No. 124,748, now Patent No. 3,413,448, dated Nov. 26, 1968. Divided and this application Oct. 17, 1967, Ser. No. 675,903
Int. Cl. G01d 15/12
U.S. Cl. 346—74 9 Claims

ABSTRACT OF THE DISCLOSURE

A system for recording high density digital information on a magnetic record using self-clocking multi-track recording. Successive input pulses are compared during recording time intervals, and their value relationship is used to determine the number of pulses recorded during each interval.

This application is a division of application Ser. No. 124,748, filed on May 25, 1961 now U.S. Patent No. 3,413,448.

BACKGROUND OF THE INVENTION

The present invention is especially useful in magnetic tape stations which form a part of an electronic digital computer system. A magnetic tape may provide storage for information which is processed in a digital computer. Modern digital computers are capable of processing data very rapidly. Accordingly, the computer can accept new data at high speed. The speed at which data can be supplied from the tape station to the computer can be increased by increasing the density of information storage on the magnetic tape records handled in the tape station. Tape stations are now in commercial use in which recording densities are of the order of 1000 bits per inch. It is desirable to increase recording densities to greater than 1000 bits per inch.

In such high density recordings, it is advantageous to record the bits of a character of digital information on different tracks of a multi-track magnetic record as trains of self-clocking pulses in each track. Self-clocking pulses are those which can be recovered without reference to external timing means. Known systems for recording digital information to be read as trains of self-clocking pulses are deficient because, for the most part, they provide a recording which is not directly related to the values of the bits which are recorded. Accordingly, somewhat complex recording and reproducing techniques are needed in these known systems to encode the bits to provide the trains of pulses for recording, or to thereafter decode the reproduced pulses to obtain the recorded bits, or both.

It is an object of the present invention to provide a simplified system for high density recording of multi-bit digital information as self-clocking trains of pulses in parallel recording tracks.

It is a still further object of the present invention to provide a system for digital recording wherein a pulse is recorded for each bit and wherein each recorded pulse corresponds directly to the value of the bit which it represents.

BRIEF SUMMARY OF THE INVENTION

In accordance with the invention, the values of the bits in successive pairs of bits to be recorded on a track of a magnetic record are first determined, and either an even number or an odd number of pulses is generated during successive time intervals depending upon whether the bit values are paired in one sense or in an opposite sense.

The bits in a pair of bits are paired in one sense, if their values are the same, i.e., both bits are binary "1" or are binary "0" or vice-versa. The magnitude of the pulse their values are different, i.e., a binary "1" followed by a binary "0" or vice-versa. The magnitude of the pulse signals which are recorded during each interval is, also, directly related to the value of one bit of each of the successive pairs of bits. Each increment or bit cell of the recording will then contain at least one pulse signal and the magnitude of this signal will be directly related to the value of the bit which it represents. Since a pulse signal is recorded in each cell along the record, the recorded pulse train has the property of being self-clocking.

DETAILED DESCRIPTION

Figure 1:
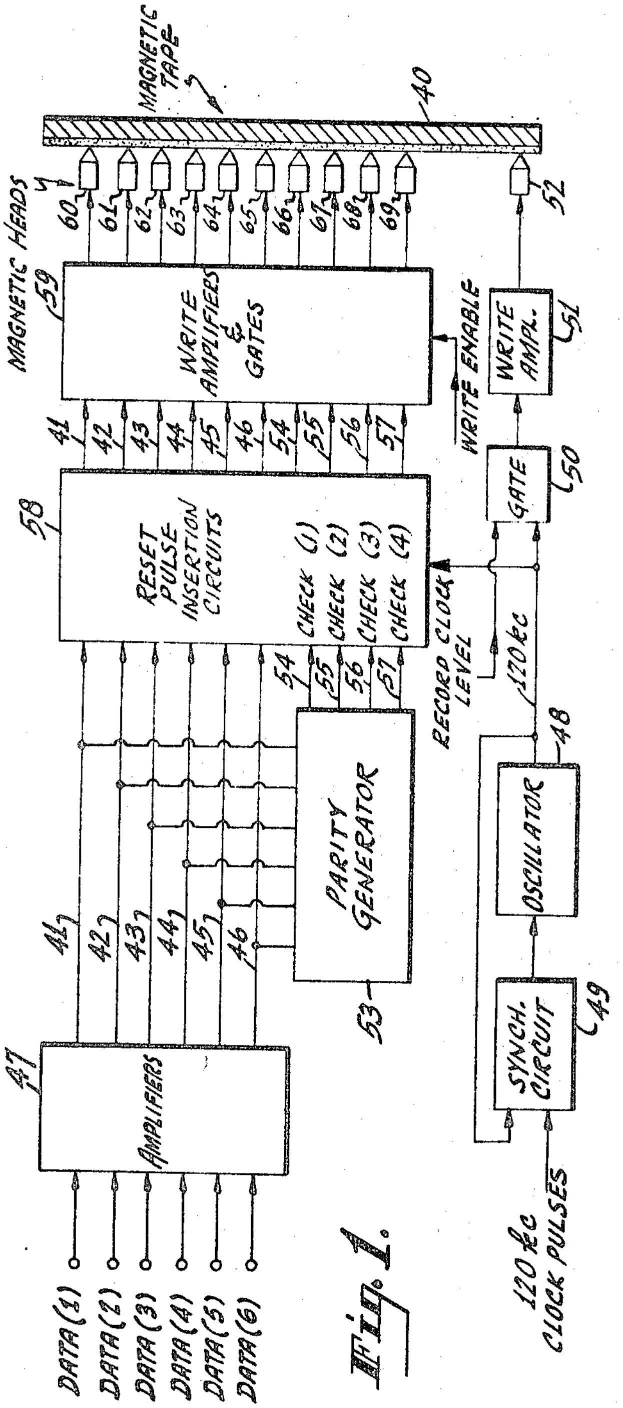
FIGURE 1 is a block diagram of a system in accordance with the invention for recording multi-bit characters of digital information on a magnetic record.

Referring more particularly to FIGURE 1 of the drawings, inputs of for six data bits are shown. Six data bits constitute a character of digital information to be recorded on and reproduced from a magnetic record, such as a magnetic tape 40, by the recording and reproducing system which will be described to illustrate the invention. Multi-bit characters of any number of binary digits may be recorded or reproduced in accordance with the invention. The recording system includes six recording channels 41–46 for the data bits. These recording channels include amplifiers 47 which separately amplify the data bits and improve their waveform.

A clock pulse channel is also provided. This channel includes an oscillator 48 which provides a train of timing pulses at, for example, 120 kc. (kilocycles per second). This oscillator may be a free running multivibrator, the frequency of which is controllable by a signal level applied to an input thereof in any known manner. This level is supplied by a frequency control circuit including a synchronizing circuit 49. The synchronizing circuit 49 may be any known circuit for comparing the frequency of two trains of pulses. The output of the oscillator 48 is connected to an input of the synchronizing circuit to provide one of these trains of pulses. The other of these two trains of pulses may be provided by the computer which is associated with the illustrated apparatus, or from a track which was prerecorded on the tape 40. Thus, the frequency of the oscillator 48 is adjusted about its nominal frequency of 120 kc. to be exactly the frequency of the clock pulses applied to the synchronizing circuit 49.

The clock pulse recording channel includes a gate 50 which has its inputs connected to the oscillator 48 and to a source providing a signal level for enabling the recording of the clock pulses. This level may be obtained from a voltage source operated by a control on the control panel of the tape station or from an associated computer. The output of the gate 50 is applied to a wire amplifier 51. This amplifier is a known pulse recording amplifier which amplifies the gate 50 output and provides a train of clock pulses. The amplifier 51 drives a magnetic head 52 which records the clock pulses on the clock track on the tape 40.

The data bits are transmitted by the recording channels 41–46 and are applied to a parity generator 53. The parity generator 53 will be described in greater detail hereinafter in connection with FIGURE 5 of the drawings. It produces four check bits and supplies these check bits to check bit recording channels 54–57. Each check bit is provided for a unique combination or group of the data bits. Each data bit is common to at least two of these combinations. Thus, for example, a first check bit 1 is provided for data bits 1, 2 and 3, and a second check bit 2 is provided for data bits 1, 4 and 5. The combinations and groups are used for error correction purposes in accordance with the invention. The check bits which are fed into the recording channels have values such that the parity of each combination of bits including the check bit pertaining to it is the same.

The data and check bits are recorded on each track of the magnetic tape 40 as trains of self-clocking pulses. Reset pulse insertion circuits 58 are provided to transform the signal levels representing the bits transmitted along each of the recording channels 41–46 and 54–57 into trains of self-clocking pulses. Each recording channel includes a reset pulse insertion circuit. The circuits 58 will be described in detail hereinafter in connection with FIGURE 5 of the drawings. The clock pulses from the clock pulse recording channel are also applied to the reset pulse insertion circuits. The reset pulse insertion circuits include bistable stages for storing successive pairs of the bits transmitted by each of the recording channels for a period equal to the interval between successive clock pulses. Depending upon the values of the bits in storage, a single pulse or a pair of pulses is provided during each clock pulse interval.

The second pulse of a pair of pulses provided during the same clock pulse interval is the reset pulse. When, for example, the binary values of a successive pair of bits are paired in one sense, for example, both bits are not alike (complements of each other), a single pulse of a magnitude which is either relatively high or relatively low is generated during a clock pulse interval. If the bits are paired in the opposite sense, for example, both bits are alike (not complements), a pair of pulses of different magnitudes is provided during the clock pulse interval. The sequence in which these paired pulses appear depends upon the binary value represented by the first bit in each of the successive pairs of like bits. Since at least one pulse is provided during each clock pulse interval to represent individual, successive bits in each of the recording channels 41–46 and 54–57, the trains of pulses transmitted for recording on the tape will be self-clocking.

Each recording channel includes a write (recording) amplifier and a gate. These write amplifiers and gates 59 are connected to the outputs of the reset pulse insertion circuits 58 which supply trains of pulses into the recording channels 41–46 and 54–57. The gates included with the write amplifiers are enabled by a write enable level obtainable internally or from an associated computer or device which provides the data to be recorded. The write amplifiers individually drive a multiplicity of magnetic heads 60–69 and record a multiplicity of parallel tracks on the magnetic tape 40.

Since pulses corresponding to the bits belonging to the same character are generated during the same clock interval, they are recorded simultaneously in parallel on the different record tracks. The magnetic heads 60–69 and 52 are desirably incorporated in a unitary magnetic head assembly of the type which is known as a multi-track magnetic head. The heads 60–69 and 52 constitute separate cores of the multi-track head. These cores include signal gaps. The signal gaps may all be in line. Accordingly, the bits belonging to the same character are recorded along the same line which is desirably perpendicular to the edges of the magnetic tape, when the magnetic tape travels along a path transverse to the line coincident with the gaps of the head.

LOGICAL ELEMENTS AND FLIP-FLOPS

The foregoing system for writing on magnetic tape may be implemented by logic circuits which include gates and flip-flops. The basic logical element is a "NAND" gate. "NAND" is an abbreviation for "not-and" and stands for the logical operation of negation of an AND operation. This gate is the building block from which the flip-flop can be formed.

Figure 2:
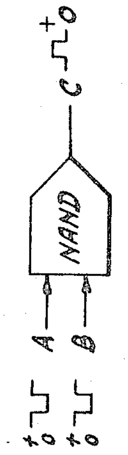
FIGURE 2 is a diagram of a gate circuit which is used in the systems of the present invention.
Figure 3:
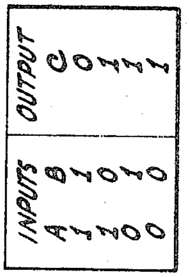
FIGURE 3 is a table illustrating the operation of the gate circuit shown in FIGURE 2.

The symbol for a NAND gate is illustrated in FIGURE 2. The "truth table" for this gate is illustrated in FIGURE 3. The NAND gate of FIGURE 2 has two inputs A and B and an output C and performs the logical operation expressed by the Boolean equation, $C=\bar{A}\cdot\bar{B}$. Voltage levels which represent the input and output bit signals, A, B and C of the gate are shown next to these respective inputs and outputs in FIGURE 2. The negative signal rule is followed in the logic circuits using NAND gates. In accordance with this rule, a relatively low voltage level represents a binary "one" bit signal and a relatively high voltage level represents a binary "zero" bit signal. These voltage levels are designated as *n* and *p*, since the high level is positive with respect to the low level and the low level is negative with respect to the high level. By way of example, the *p* level may be above +6 (six) volts and the *n* level may be 0 (zero) volts.

Figure 4:
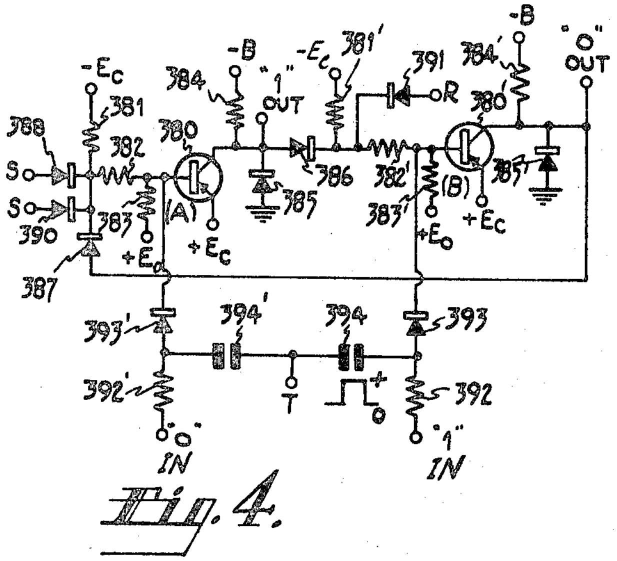
FIGURE 4 is a schematic diagram of a triggerable flip-flop of the type used in the circuit shown in FIGURE 5.

A pair of NAND gates combined with each other and with a steering circuit to form a triggerable flip-flop are shown in FIGURE 4. The NAND gate which forms one side, side A, of the flip-flop includes a plurality of diodes 387, 388 and 390, a P-N-P transistor 380, a biasing circuit including three resistors 381, 382 and 383, a collector resistor 384, and a clamping diode 385. Operating voltage from a source thereof, indicated as −B, and biasing voltages $-E_c$, $+E_0$ and $+E_c$ are applied to the biasing circuit and the emitter of the transistor. These biasing voltages may be derived from a source having a common return such as ground.

When binary "one" bit signals are applied to the anodes of all the diodes, 387, 388, 390 the base of the transistor becomes negative with respect to its emitter and the transistor conducts. The collector then goes positive. The output of the gate is taken at the collector. This output will represent a binary "zero" bit. If binary "zero" bit signals are applied to any of the diodes 387, 388, 390 anodes, the base of the transistor will be positive with respect to its emitter so that the transistor is nonconductive. The collector voltage will then be approximately zero volts since the collector is clamped to ground. A binary "one" bit is then represented by the output voltage of the gate.

The flip-flop shown in FIGURE 4 includes two identical NAND gates. The above described gate constitutes side A of the flip-flop and another gate constitutes side B thereof. The parts of the side B gate are designated with reference numerals like those of side A, but with primes appended to these numerals.

The sides A and B are cross-coupled by means of diodes 386 and 387. These diodes 386 and 387, respectively, connect the collectors of the transistors of one side A or B to the base biasing circuits of opposite sides B or A of the flip-flop.

The set input terminals, two of which are shown, are connected by means of the diodes 388 and 390 to the base of the transistor 380 through the resistor 382. As many set input terminals as are required may be provided. Each additional set input terminal requires an additional diode.

The reset input terminal is connected through a diode 391 to the base of the transistor 380 by way of the resistor 382. The "1" output terminal is connected to the collector of the transistor 380. The "0" output terminal is connected to the collector of the transistor 380'. A triggering circuit is connected to the bases of the transistors 380 and 380'. This triggering circuit serves to advance bits signals applied to the "1" and "0" input terminals into the flip-flop circuit for storage therein. A resistor 392 and diode 393 are connected between the "1" input terminal and the base of the transistor 380'. A resistor 392' and a diode 393' which are identical to the resistor 392 and diode 393 are connected between the "0" input terminal and the base of the transistor 380. The trigger input terminal T is connected through capacitors 394 and 394' to the junction of resistor 392 and diode 393 and the junction of resistor 392' and diode 393', respectively.

When a set input positive pulse is applied to the set input terminal S, the voltage at the base of the transistor 380 becomes positive. This causes the transistor 380 to be nonconductive. A current path is then established from ground through the clamping diode 385 and collector load resistor 384 to the source of operating voltage —B. The voltage at the collector of the transistor 380 is clamped by the diode 385 to about zero volts. The "1" output of the flip-flop therefore is a relatively low voltage of about zero volts, when the flip-flop is set.

The cross-coupling diode 386 is nonconducting when the transistor 380 is nonconductive, since the potential at the diode 386 anode is lower than its cathode potential established by the base biasing circuit for the transistor 380'. The transistor 380' is in its conductive state when the flip-flop is set. A positive voltage is developed across the collector load resistor 384' measured from the collector to the source of operating voltage —B. This positive voltage causes the cross-coupling diode 387 to conduct such that a sufficiently positive voltage is maintained on the base of the transistor 380' on the first side A of the flip-flop to maintain that transistor nonconducting. The "0" output terminal of the flip-flop is at positive voltage level when the circuit is in its set condition.

When a positive reset pulse is applied to the reset terminal R the states of conduction of the circuit reverse. The "0" output terminal returns to about zero voltage level and the "1" output terminal rises to a positive level. From the foregoing, it is apparent that when the flip-flop is set the voltage level at its "1" output represents a binary "one" bit and the voltage level at its "0" output represents a binary "zero" bit. When the flip-flop is reset, a binary "zero" bit is represented at the "1" output and a binary "one" bit at the "0" output.

The triggering circuit senses the voltage at the bases of the transistors 380 and 380'. If the flip-flop is set a relatively high voltage will be applied to the cathode of the diode 393' and relatively low voltage will be applied to the cathode of the other diode 393. When a binary "one" bit signal (*n* voltage) and binary "zero" bit signal (*p* voltage) appear at the "1" and "0" input terminals, respectively, the diodes 393 and 393' will not conduct. The positive edge of a trigger pulse applied to the T input, therefore, does not reach the transistors 380 and 380' and the flip-flop remains in its set condition of operation. This effectively transfers or advances the "one" and "zero" bits appearing, respectively, at the inputs to the "1" and "0" outputs of flip-flop circuit, since "one" and "zero" bits signals appear at these "1" and "0" outputs after the trigger pulse is applied to the T input. If a "zero" bit signal (*n* voltage) is applied to the "1" input and a "one" bit signal (*p* voltage) is applied to the "0" input, the diode 393 will be biased close to conduction. Thus, the positive edge of the trigger pulse will be transmitted by the capacitor 394 and the diode 393 and causes the transistor 380' to cut off. This resets the flip-flop. A "zero" bit signal will then appear at the "1" output of the flip-flop and a "one" bit will then appear at the "0" output. Thus, the bits appearing at the inputs "1" and "0" are advanced respectively to the "1" and "0" outputs of the flip-flop circuit. The flip-flop operates in a similar manner in cases where it is initially reset, rather than set.

WRITING CIRCUITS

Figure 5:
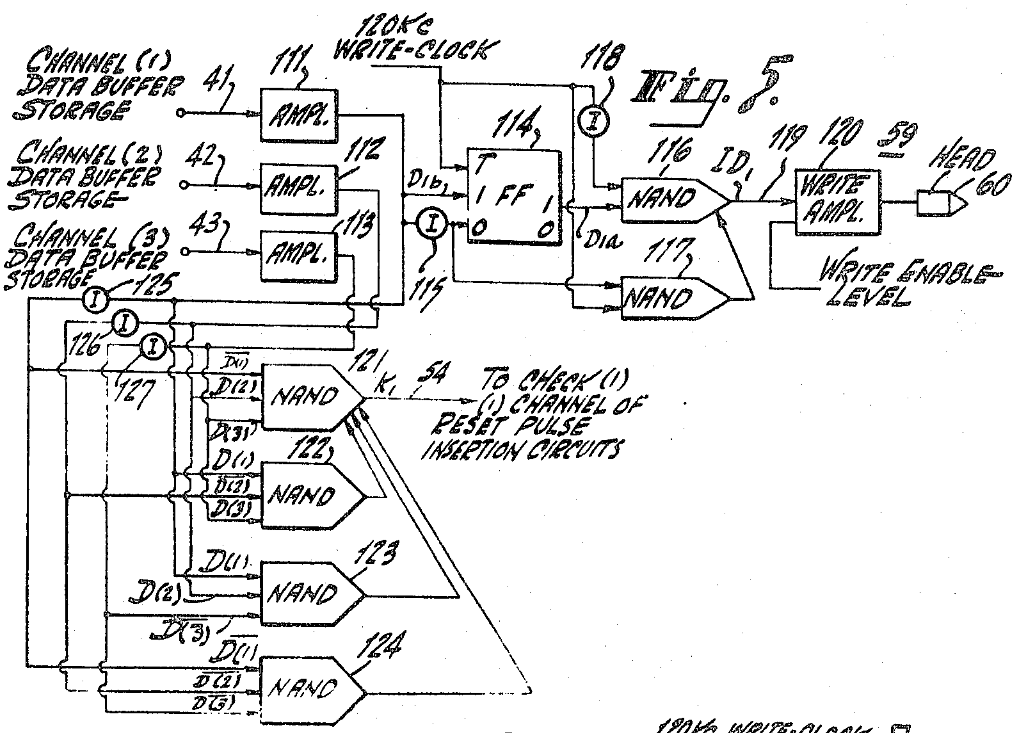
FIGURE 5 is a block diagram showing in detail one recording channel of the system for recording digital information on a magnetic record which is illustrated in FIGURE 1.
Figure 6:
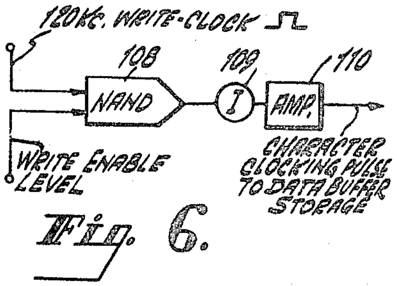
FIGURE 6 is a block diagram of input circuitry for the recording system illustrated in FIGURE 5.
Figure 7:
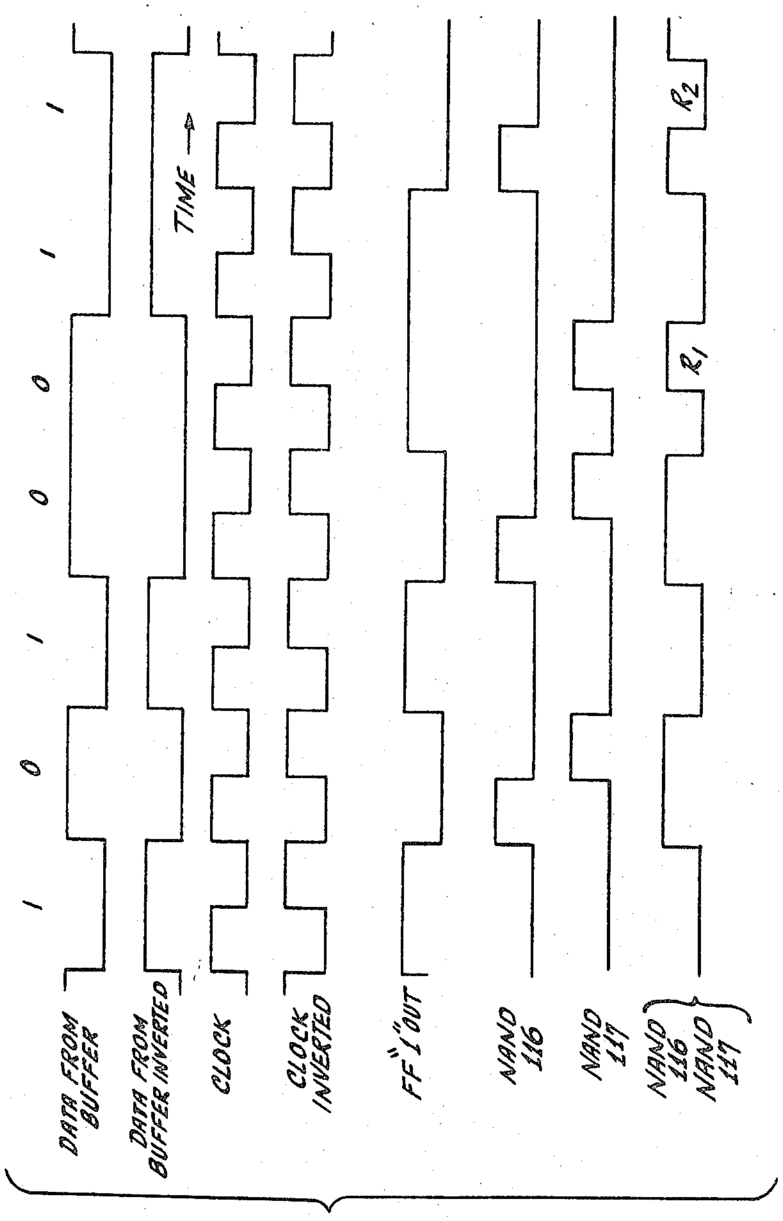
FIGURE 7 is a timing chart illustrating the operation of the system shown in FIGURE 5.

The system for recording or writing the bits of a binary character onto the tracks of the magnetic tape record 40 will be better understood by reference to FIGURES 5, 6 and 7. These figures illustrate in detail one of the data bit recording channels and part of one of the check bit recording channels of the overall writing system shown in FIGURE 1.

The characters to be recorded on the magnetic tape record may be temporarily stored in data buffer storage devices (not shown) of known design for example, magnetic core or transistor flip-flop registers. The bits of a character are read out of the data buffer storage devices into the recording or writing channels 41 to 46 (FIGURE 1), which include the amplifiers 47, simultaneously upon occurrence of each clock pulse. The circuit of FIGURE 6 provides clock pulses for reading the characters of the information to be recorded out of the data buffer storage device. A train of negative going 120 kc. write clock pulses which may be derived from the oscillator 48 (FIGURE 1) are applied to the input of a NAND gate 108. The write enable level is applied to another input of this gate 108. When the write enable level is present, a relatively low voltage is applied to the write enable level lead of the gate 108. The gate 108 is enabled and the write clock pulses pass therethrough. The NAND gate 108 inverts the clock pulses applied to its input. Accordingly, an inverter circuit 109 is connected to the output of the NAND gate 108. This inverter circuit may be a transistor circuit of a known design. Design techniques for such circuits are described in an article by R. A. Henley et al., entitled "The Application of Transistors to Computers," appearing in the Proceedings of the IRE, vol. 46, No. 6, June, 1958, particularly on pages 1242 through 1244, inclusive. An amplifier 110 follows the inverter 109. If desired, the amplifier 110 may be designed to invert the pulses applied to its input so that the inverter 109 may be omitted.

The recording channels 41, 42 and 43 each include a separate amplifier 111, 112 and 113 (FIGURE 5). These amplifiers form the amplifier stages 47 shown in FIGURE 1.

The reset pulse insertion circuit 58 for the recording channel 41 includes a triggerable flip-flop 114 and NAND gates 116 and 117. The flip-flop 114 is a bistable circuit of the type shown in FIGURE 4. The output of the amplifier 111 in the recording channel 41 is connected directly to the "1" input of the triggerable flip-flop 114. The output of the amplifier 111 is also inverted in an inverter 115 and applied to the "0" input of the flip-flop 114. Output bits are derived only from the "1" output. The write clock pulses are applied to the trigger input T. When a clock pulse occurs, the bits applied to the "1" input are transferred to the "1" output of the flip-flop, as was explained in connection with FIGURE 4. Successive pairs of bits will, therefore, appear at the input and output of the flip-flop 114 simultaneously for a cycle of the clock pulses. The first of a successive pair of bits appears for a clock pulse cycle at the "1" output of the flip-flop 114. The second bit of a successive pair of bits appears at the "1" input of the flip-flop 114 during a clock pulse cycle.

A pair of NAND gates 116 and 117 are also included in the recording channel 41. An input of a first of these gates 116 is connected to the "1" output of the flip-flop 114. This gate 116 has another input which is connected through an inverter stage 118 to the line which supplies the 120 kc. write-clock pulses. Thus, the inverted clock pulses are compared with the preceding one of each successive pair of data bits transmitted by the channel 41. The other gate 117 has two inputs which are respectively connected to the line providing the clock pulses and to the output of the inverter 115 which inverts the data pulses transmitted by the channel 41.

The gates 116 and 117 are interconnected at their outputs. This interconnection is schematically shown in the drawing by a line drawn from the output of the gate 117 to the wedged portion of the block which represents the gate 116. This connection illustrates that the circuits 116 and 117 also perform the logical OR function. In practice the gates 116 and 117 may share a common output circuit; that is to say, there may be a common output resistor (not shown) connected from a source of operating voltage to the collector of the transistor in each of the gates. When the output of either of the gates 116 and 117 is a relatively high voltage (*p*), that output will appear on output line 119 associated with both of the gates 116 and 117.

The output of the gates 116 and 117 is a train of pulses including at least one pulse for each cycle of the clock pulse train. This output is applied to the input of a write amplifier 120. This write amplifier 120 is a pulse amplifier having another input to which the write enable level is applied. The output of the write amplifier is connected to to the head 60 which records pulses passed by the recording channel 41 on one of the tracks of the multi-track record 40. The write amplifier 120 forms part of the write amplifier and gates 59 (FIGURE 1).

The recording current from the write amplifier is used by the head 60 to magnetize the tape. The tape is magnetized by the recording current to opposite polarities of magnetic saturation in a manner such that the signals recorded on the tape directly represent the values of the bits of digital information which are transmitted by the recording channel.

FIGURE 5 also illustrates, in part, one of the recording channels 54 which records the first check bit $K_1$ on one of the tracks along the tape 40. The stage of the parity generator 53 which provides the check bit $K_1$ is shown in FIGURE 5. The check bit $K_1$ is provided to check the parity of a unique combination of the data bits which are to be recorded. This bit combination includes the data bits $D_1$, $D_2$ and $D_3$. The check bit $K_1$ which is generated has a value such that the combination of the data bits $D_1$, $D_2$ and $D_3$ and the check bit $K_1$ will have even parity.

The stage of the parity generator 53 which provides the check bit $K_1$ includes four NAND gates 121, 122, 123 and 124. Each of these gates has three inputs. These inputs receive bits $D_1$, $D_2$ and $D_2$ derived from the recording channels 41, 42 and 43. Three inverter circuits 125, 126 and 127 are connected to the outputs of the amplifiers 111, 112 and 113 in the channels 41, 42 and 43, respectively. The gate circuits 121 to 124 have a common output which is connected to the recording channel 54 for the first check bit $K_1$. This recording channel 54 includes a reset pulse insertion circuit and a write amplifier stage which form part of the circuits 58 and 59, respectively, (see FIGURE 1). The output of the write amplifier for the check bit recording channel 54 will drive the head 66 which records the check pulses $K_1$ on the first check bit track of the tape.

The operation of the parity generator 53 will follow from an examination of Table I which appears below. All of the possible combinations of data bits $D_1$, $D_2$ and $D_3$ are represented in this Table I. This table indicates what binary values must be provided for the check bit $K_1$ to preserve even parity for every combination.

TABLE I

| $D_1$ | $D_2$ | $D_3$ | $K_1$ |
|---|---|---|---|
| 0 | 0 | 1 | 1 |
| 0 | 0 | 0 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

The conditions set forth in Table I may be expressed in accordance with the following Boolean equation.

$$K_1 = D_1\overline{D}_2\overline{D}_3 + \overline{D}_1 D_2 \overline{D}_3 + \overline{D}_1\overline{D}_2 D_3 + D_1 D_2 D_3 \qquad (1)$$

The circuit of NAND gates 121 to 124 mechanizes the Boolean expression of equation (1). Accordingly, the output of the check bit $K_1$ will be either a binary "zero" or a binary "one" depending upon the values of the data bits $D_1$, $D_2$ and $D_3$ in the case of each of the characters. Four stages are also provided in the parity generator 53 similar to the stage illustrated in FIGURE 5. One of these stages checks the parity of data bits $D_1$, $D_4$ and $D_5$ and provides check bit $K_2$. Another stage of the parity generator checks the parity of data bits $D_2$, $D_4$ and $D_6$ and provides check bit $K_3$. Still another stage of the parity generator checks the parity of data bits $D_3$, $D_5$ and $D_6$ and provides the fourth check bit $K_4$. Since the stages for checking the parity of the various combinations of three of the data bits are similar, their operation and construction should follow from the above discussion. All generate parity check bits for even parity in this instance.

Referring to FIGURE 7 a timing chart is shown which represents waveforms of signals which appear during operation of the recording channel 41 shown in FIGURE 5. These waveforms are idealized to simplify the illustration. Other waveforms which are illustrated throughout the drawings are idealized for similar reasons.

A series of data bits which may be read out of the buffer storage into the channel 41 is illustrated, and the bits are designated "ones" or "zeros" as the case may be. It will be noted that when binary "one" bits or binary "zero" bits occur in succession the voltage levels representing these bits do not change. These bits are amplified and inverted by the inverter 115. The appearance of the data bits after inversion is illustrated below the illustration of data bits from the buffer. A train of clock pulses from the oscillator 48 (FIGURE 1) is also illustrated. The first data bit is gated out of the data storage buffer by the first clock pulse and is applied to the "1" input of the flip-flop 114. This data bit is also inverted and applied to the "0" input of the flip-flop 114. Upon occurrence of the second clock pulse, this first data bit is advanced to the "1" output of the flip-flop 114 and the next data bit appears at the "1" input of the flip-flop 114. In other words, during each clock pulse interval, the first data bit of a successive pair of bits is at the "1" output of the flip-flop 114 and the second or succeeding bit of this pair of bits is at the "1" input of the flip-flop. This pair of data bits is indicated, respectively, as $D_{1a}$ and $D_{1b}$ in FIGURE 5 adjacent the inputs and outputs of the flip-flop 114. The inverted clock pulses and the data bits $D_{1a}$ are applied to the upper NAND gate 116.

When both inputs to the NAND gate 116 are at *n* voltage level, the NAND gate 116 produces a *p* voltage level at the output thereof. The duration of the *p* level provided by the NAND gate 116 is equal to the duration of one-half of a cycle of the clock pulses, since the clock pulse is of *n* level for only one-half of a clock pulse cycle. The lower NAND gate 117 compares the first of the pair of inverted data bits $\overline{D}_{1b}$ with the clock pulses. This NAND gate 117 provides *p* level of duration equal to one-half of a clock pulse cycle, when the inverted data bits $\overline{D}_{1b}$ and the clock pulse each are simultaneosuly of *n* level.

Accordingly, the outputs from both gates 116 and 117 added together will provide a *p* level pulse equal in duration to a complete cycle of a clock pulse for every second bit $D_{1b}$ of a successive pair of bits which represents a "zero" when it is preceded by a bit $D_{1a}$ which represents a "one."

A pulse having a duration of an entire clock pulse cycle which is of *n* voltage level is provided at the output of the gates 116 and 117 for each second bit $D_{1b}$ representing a "one" which is preceded by a bit $D_{1a}$ representing a "zero." When two bits each representing "zeros" follow each other in succession, a pulse of *n* voltage level will be provided for half a clock pulse cycle. This pulse will be followed in the succeeding half of the same clock pulse cycle by a reset pulse (labeled $R_1$ in FIGURE 5) which is of *p* voltage level. The converse is true for succeeding and preceding pulses representing "one." In the latter case a reset pulse (labeled $R_2$ in FIGURE 5) will be provided. Thus, reset pulses are inserted during part of the duration of the latter one of a successive pair of bits having the same value. The presence of these reset pulses insures that there will be a change in magnitude at the end of each bit which is recorded on the tape which is of a sense corresponding directly to the value thereof. At least one change in magnitude occurs during each clock pulse cycle. Thus, bits recorded by each recording channel will be self-clocking.

The recording current provided by the write-amplifier 120 corresponds to the voltage at the output of the NAND gates 117 and 116. The amplifier 120 operates so that a "one" is represented by a positive going pulse while a "zero" is represented by a negative going pulse. Positive and negative currents in response to each of these pulses flow through the head 60 connected to the write amplifier 120 output. These positive and negative currents cause saturation of the tape in incremental areas, called "bit cells," of the tape so that a bit cell is saturated either, in the P or positive direction or in the N or negative direction.

An analysis of the binary data to be recorded and the train of pulses which are provided by the reset pulse insertion circuit shows that the following rules describe the operation of the reset pulse insertion circuit.

(1) If the second bit ($D_{1b}$) of a successive pair of bits is opposite in value from the first bit ($D_{1a}$) of that pair, the polarity of the pulse to be recorded to represent the first bit is positive, if the first bit is a "zero" and is negative if the first bit is a "one."

(2) If the second bit ($D_{1b}$) and the first bit ($D_{1a}$) of the bit pair are both "ones" the polarity of the pulse which is recorded to represent the first bit is positive, which is the same as the polarity of the clock pulses during the first half of each clock pulse cycle thereof.

(3) If the second bit ($D_{1b}$) and the first bit ($D_{1a}$) are both "zero" the pulse to be recorded to represent the first bit is negative, which is opposite to the polarity of the clock pulses during the first half of each clock pulse cycle.

These rules can be expressed in accordance with the Boolean equation:

$$I_{D1}=(D_{1a}\overline{D}_{1b}+\overline{D}_{1a}D_{1b})D_{1a}+(D_{1a}D_{1b})K+(\overline{D}_{1a}\overline{D}_{1b})\overline{K} \quad (2)$$

Equation 2 can be simplified and expressed as follows:

$$I_{D1}=D_{1a}\overline{K}+\overline{D}_{1b}K \quad (3)$$

In the foregoing equations the pulses to be recorded are represented by the term, $I_{D1}$. The clock pulse is represented by the term, K as heretofore.

What is claimed is:

1. In a system for recording the bits of digital information, a recording signal generating system which comprises means for storing a pair of bits of said information which occur successively, and means for providing a signal having a first waveform when the values of said bits are the same and having a second waveform when different from said first waveform when the values of said bits are different, wherein said last-mentioned means includes means for comparing said stored bits during a storage interval, said first and said second waveforms differing from each other in the number of changes in value during said interval.

2. In a system as set forth in claim 1, wherein said means for providing a recording signal includes means responsive to said comparing means to produce said first signal having at least one change in polarity when said stored pair of bits are paired in one sense and said second signal having at least two changes in polarity when said stored pair of bits are paired in the opposite sense.

3. A system for generating a series of pulses in response to digital information represented by binary bits which occur upon occurrence of repetitive timing pulses, said timing pulses each being of opposite value in successive periods thereof, which system comprises means for simultaneouly providing, during the occurrence of each of said timing pulses, a signal representing one of said bits and another signal representing the bit next succeeding said one bit, and means for providing, during each period of said timing pulses, an output pulse having a value in accordance with the Boolean expression, $$I=X_1\overline{C}+X_2C$$

wherein:

$X_1$=the value representing said one bit,
$X_2$=the value representing said succeeding bit,
C=the value of each said timing pulses, and
I=the value of said output pulse.

4. In a system for recording digital information, a system for generating pulse signals coded in accordance with said information comprising a source of repetitive timing pulses each having at least one alternation in value, means for providing signals each representing successive bits of said information, means for comparing each of said successive bit signals with said timing pulses for providing output pulses of one polarity, if said bit signals and said timing pulses are of the same polarity, and of opposite polarity, if both said bit signals and said timing pulses are of opposite polarity.

5. A system for encoding binary digits into pulses for recording which comprises means for registering successive pairs of said digits which occur one preceding the other, and means for providing for a given period of time a pulse for each of said digits, said pulse having one of two magnitudes, one of which is relatively high with respect to the other, as determined by the value of said one digit of each of said successive pairs of digits in said registering means when the values of said one digit and said other digit are different, said last-named means also providing another pulse in said same period of time having the other of said two magnitudes when the values of said one digit and said other digit are the same.

6. A system for recording on a magnetic record non-return-to-zero signals in response to binary digits which comprises a source of clock pulses which alternate cyclically from a relatively high magnitude to a relatively low magnitude, means for registering successive pairs of said binary digits during each cycle of said clock pulses, and means for recording a signal during each cycle, said recording signals having a polarity determined by the value of each bit of each of said pairs of bits and the magnitude of said each clock pulse during each of said cycles.

7. A system for recording binary digits which comprises a source of clock pulses which vary cyclically in magnitude such that successive clock pulses are respectively of relatively high and relatively low magnitude, a triggerable flip-flop having input and output terminals, means for applying said binary digits to said input terminal, means for triggering said flip-flop with said clock pulses such that on occurrence of each successive clock pulse of the same magnitude one of said binary digits next preceding a succeeding one of said binary digits is advanced to said output terminal while said succeeding binary digit appears at said input terminal, gate means for comparing an inverted form of said clock pulse with said preceding digit and said clock pulse with an inverted form of said succeeding digit for providing an output signal when either of the values thereof correspond to each other, and means for recording said output signal.

8. A system for recording binary digits as set forth in claim 7, wherein said gate means includes first and second circuits for performing the logical NAND function, means for inverting said succeeding digits, means for inverting said clock pulses, means for applying said inverted clock pulses and said preceding bits to said first circuit, and means for applying said clock pulses and said inverted succeeding bits to said second circuit.

9. A system for recording binary digits as set forth in claim 7 wherein said output signal has at least one change in polarity during the storage time of said one binary digit on said output terminal of said flip-flop when said preceding and succeeding digits are paired in one sense and at least two changes in polarity during said storage time when said preceding and succeeding digits are paired in the opposite sense.

References Cited

UNITED STATES PATENTS

| | | | |
|---|---|---|---|
| 3,067,422 | 12/1962 | Hunt | 346—74 |
| 3,110,866 | 11/1963 | Maure | 328—110 |

BERNARD KONICK, Primary Examiner

V. P. CANNEY, Assistant Examiner

U.S. Cl. X.R.

340—174.1